Sept. 29, 1959 L. C. HOBBS 2,907,003

INFORMATION HANDLING SYSTEM

Filed July 1, 1954 2 Sheets-Sheet 1

INVENTOR.
Linder C. Hobbs
BY Morris A. Rabkin
ATTORNEY

INVENTOR.
Linder C. Hobbs
BY Morris [signature]
ATTORNEY.

United States Patent Office
2,907,003
Patented Sept. 29, 1959

2,907,003

INFORMATION HANDLING SYSTEM

Linder C. Hobbs, Haddonfield, N.J., assignor to Radio Corporation of America, a corporation of Delaware Application July 1, 1954, Serial No. 440,692

18 Claims. (Cl. 340—174)

Figure 1:
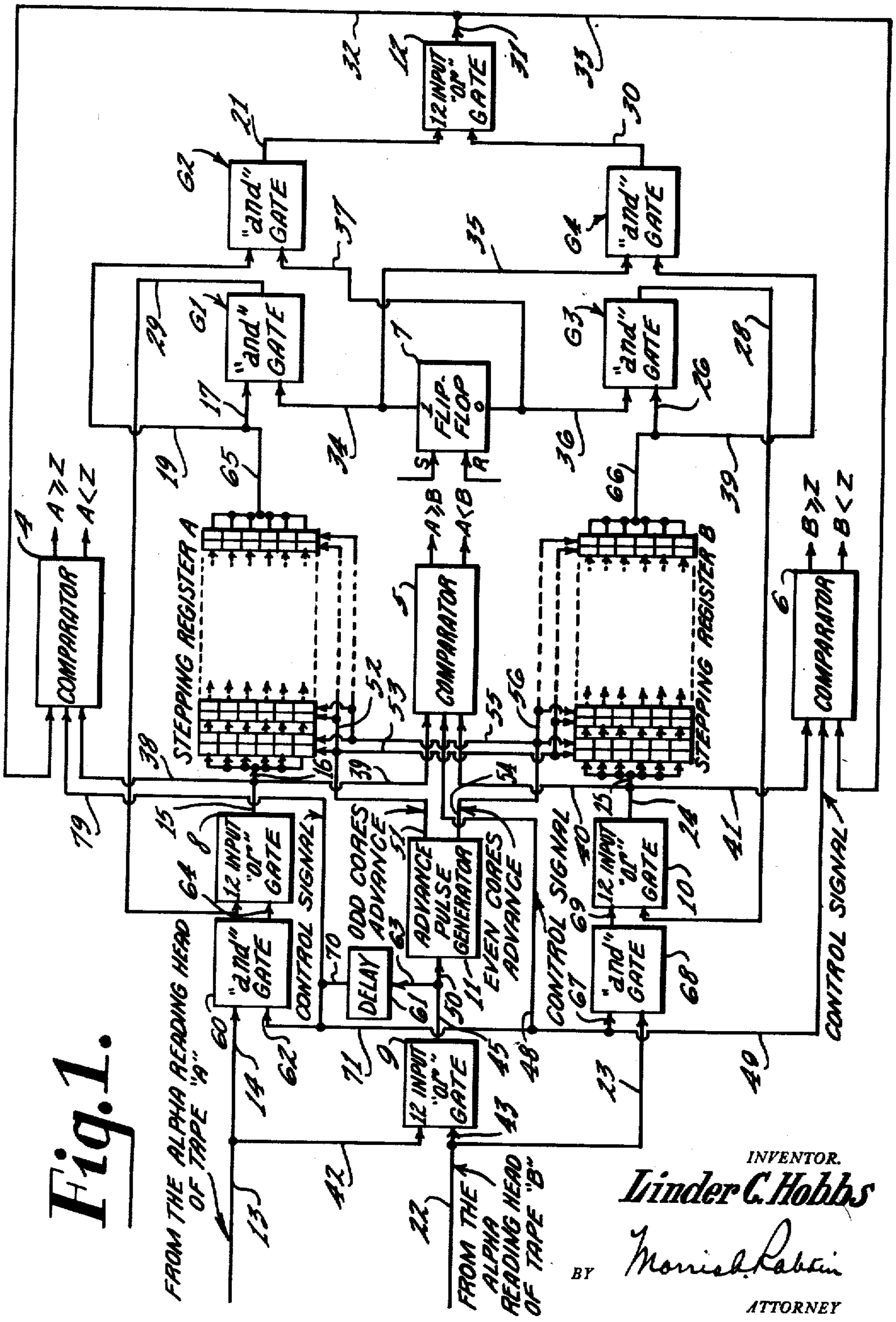

This invention relates to an improved memory system for information handling machines, and particularly to an improved memory system for use in a sorting system.

In many business and scientific applications, large masses of raw information must be handled and/or analyzed. Large-scale electronic machines of the digital type are being used to process this information particularly because of their high speed and precision. It is the general practice to encode the incoming information on magnetic or paper tape because a great amount of information can be stored on a small bulk of tape.

One of the recurring problems in processing information encoded on tape is the necessity for arranging it in some predetermined order such that a specific unit of information is available when it is to be processed by the machine.

Among the methods which are used for sorting the encoded information into a desired sequence are the "strings-of-two" method and the "progressive sorting" method.

In the "strings-of-two" method, the information is evenly divided onto two input tapes. Two units of information are then selected, one from each of the two input tapes, and compared one with the other. If it is desired to sort the units of information into an ascending sequence, the smaller unit is transferred to one of two output tapes. The larger of the two units is then transferred to the same output tape following the smaller unit. The second two units of information are than selected, one from each of the input tapes and compared one with the other. The smaller of the latter two units is then transferred to the second output tape and is followed in turn by the larger unit. The procedure of selecting, comparing and transferring the units of information continues until all of the units of information encoded on the input tapes have been rearranged in sequential groups of two on the output tapes.

The output tapes then become the input tapes and two new output tapes are provided. The same procedure is followed except that each sequential group on an output tape is composed of four units of information. This procedure is continued in subsequent operations except that each time the output tapes become the input tapes, the number of units of information on the new output tapes is increased by a power of two, until finally all the units of information appear in one sequential group on a single output tape.

An apparatus for sorting by the "strings-of-two" method is disclosed in the copending application of Howard P. Guerber, Serial No. 427,167, filed May 3, 1954.

In the "progressive sorting" method, the units of information may be divided onto two input tapes, herein termed tape A and tape B. However, the "progressive sorting" method differs from the "strings-of-two" method in that the larger of the units of information is not automatically transferred to the same output tape as the smaller. Instead, two additional comparisons are carried out and a selection is made as to that output tape to which a unit of information is to be transferred. In the following expressions:

$a$ represents the order-determining portion of a unit of information A encoded on input tape A.

$b$ represents the order determining portion of a unit of information B encoded on input tape B.

$z$ represents the order-determining portion of the most recent unit of information Z transferred to an output tape.

The set of expressions show the basis of the transfer after the comparisons.

$$\left.\begin{array}{l} b \geqq a,\ a \geqq z,\ b \geqq z \\ b < a,\ a \geqq z,\ b < z \end{array}\right\} \text{transfer A to the same output tape as Z}$$

$b \geqq a,\ a < z,\ b < z$ transfer A to the other output tape $$\left.\begin{array}{l} b < a,\ a \geqq z,\ b \geqq z \\ b \geqq a,\ a < z,\ b \geqq z \end{array}\right\} \text{transfer B to the same output tape as Z}$$

$b < a,\ a < z,\ b < z$ transfer B to the other output tape.

As between $a$, $b$, and $z$, only one of the above expressions is satisfied at any one time. Therefore, a basis is established for either continuing the sequence on the same output tape as Z, or beginning a new sequence on the other output tape.

Briefly, the comparison indicates whether or not an ascending sequence may be continued on the same output tape as Z. Thus, if both $a$ and $b$ are equal to or greater than $z$, the sequence may be continued and the unit of information A or B corresponding to the lesser of $a$ or $b$ is transferred to the same output tape as Z. If only one $a$ or $b$ is greater than or equal to $z$, again the sequence may be continued, and the unit of information A or B corresponding to the greater of $a$ or $b$ is transferred to the same output tape as Z. If both $a$ and $b$ are less than $z$, the sequence cannot be continued, and the unit of information A or B corresponding to the lesser of $a$ or $b$ is transferred to the other output tape. In any event, the new $z$ corresponds to the $a$ or $b$ last transferred to an output tape, and a new comparison is made by replacing the $a$ or $b$ transferred with the $a$ or $b$ of the following message on the corresponding A or B input tape. It is possible to record the messages in a descending sequence on an output tape by suitably interchanging the $a$, $b$, and $z$ terms in the above expressions.

After all the units of information have been rearranged on the two output tapes, the output tapes then become the input tapes. The same procedure is followed until finally all of the units of information appear in a single sequence on one output tape.

A detailed example of a "progressive-sorting" technique is shown in the aforementioned Guerber application Serial No. 427,167.

The prior art "progressive sorting" systems employ three different memory units. One memory unit is used to store $a$, a second memory unit is used to store $b$, and a third memory unit is used to store $z$.

The present invention is directed to a system which requires only two memory units instead of the conventional three memory units.

Therefore, an object of the present invention is to provide an improved sorting apparatus wherein a lesser amount of equipment is required.

A further object of the present invention is to provide a novel arrangement for furnishing three different pieces of information, in pairs of two, to the inputs of three different comparators wherein but two memory units are required.

A still further object of the present invention is to provide an improved apparatus for sorting, according to the "progressive sorting" method, wherein but two memory units are required.

An additional object of the present invention is to provide an improved "progressive sorting" apparatus wherein the gating arrangement, associated with the output side of each memory unit, is actuated in accordance with the unit of information last transferred to an output tape.

A still further object of the present invention is to provide an improved electronic logical sorting system which requires a minimum amount of electronic equipment.

DEFINITIONS

*Message.*—A message is a unit of information. Each message contains a plurality of items of data such as the name of a person, a street address, a change of address, a business transaction etc.

*Serial number.*—A serial number is a group of order-determining characters which have some logical significance such as numbers or letters. Each group of characters may represent a word or a multi-digit number or some other logical term.

*Character.*—A character is a coded group of signals which may be, for example, a permutation of binary bits arranged in a plurality of channels such that a given combination of bits represent a letter, a number or some preassigned symbol.

*Message arrangement.*—The messages are encoded on both input tapes in serial fashion. Each message contains a serial number which denotes the order of precedence of a particular message in the desired sequence. In the present embodiment, the maximum number of characters in a serial number is thirty-two although a particular serial number may contain less than thirty-two. If a serial number contains less than thirty-two characters, it is completed by the addition of null characters. The highest-order-determining character representing either a letter or a number is encoded first, followed in order by the next succeeding characters according to their rank. The first character of each message may be a start message symbol, and the last character of a serial number may be a stop message symbol.

The above definitions are for the purpose of explanation and are not to be construed as limiting. The memory system of the present invention is compatible with variable word length systems, as well as fixed length word systems, as will be apparent to those skilled in the art.

The above and further objects of the present invention are carried out by providing a pair of reading heads adjacent the path of each input tape. The serial number of a message encoded on input tape A is read into a first register by a first or alpha reading head which is coupled to the inputs of said first register through a first "or" gate. The serial number of a message encoded on input tape B is likewise read into a second register by means of a first or alpha reading head which is coupled to the inputs of the second register by means of a second "or" gate.

Two different gates are respectively connected to the outputs of each register. The function of the first gate associated with the outputs of said first register is to recirculate the serial number of the "A" message back to the inputs of the first register and also to furnish the serial number of the "A" message to an input of a first and a second comparator. The second gate connected to the output of the first register is used to circulate the serial number of the "A" message to an input of the first and a third comparator.

The first and second gates associated with the outputs of the second register perform the same function in connection with the serial number of the "B" message as the first and second gates associated with the output of the first register.

A two-position switch is also provided. One side of the switch is used to open the first gate associated with the first register and the second gate associated with the second register. The second position of this switch is used to open the second gate associated with the output of said first register and the first gate associated with the outputs of said second register. The two-position switch is set to the one position or the other depending upon whether input tape A or input tape B is running.

The outputs of the comparators are each connected to a logical circuit, not described herein, because it does not form a part of the present invention. The logical circuit operates to determine, in accordance with the logical expressions, whether to transfer a message from input tape A or to transfer a message from input tape B to one of the output tapes. A message is read out to an output tape by the aforementioned second or beta reading head which is adjacent the path of each input tape.

The serial number recirculated is furnished to the inputs of its associated register in synchronism with the fresh or incoming serial number which is, in turn, furnished to the inputs of its associated register. The decision of the logical network is staticized in the two-position switch.

Figure 2:
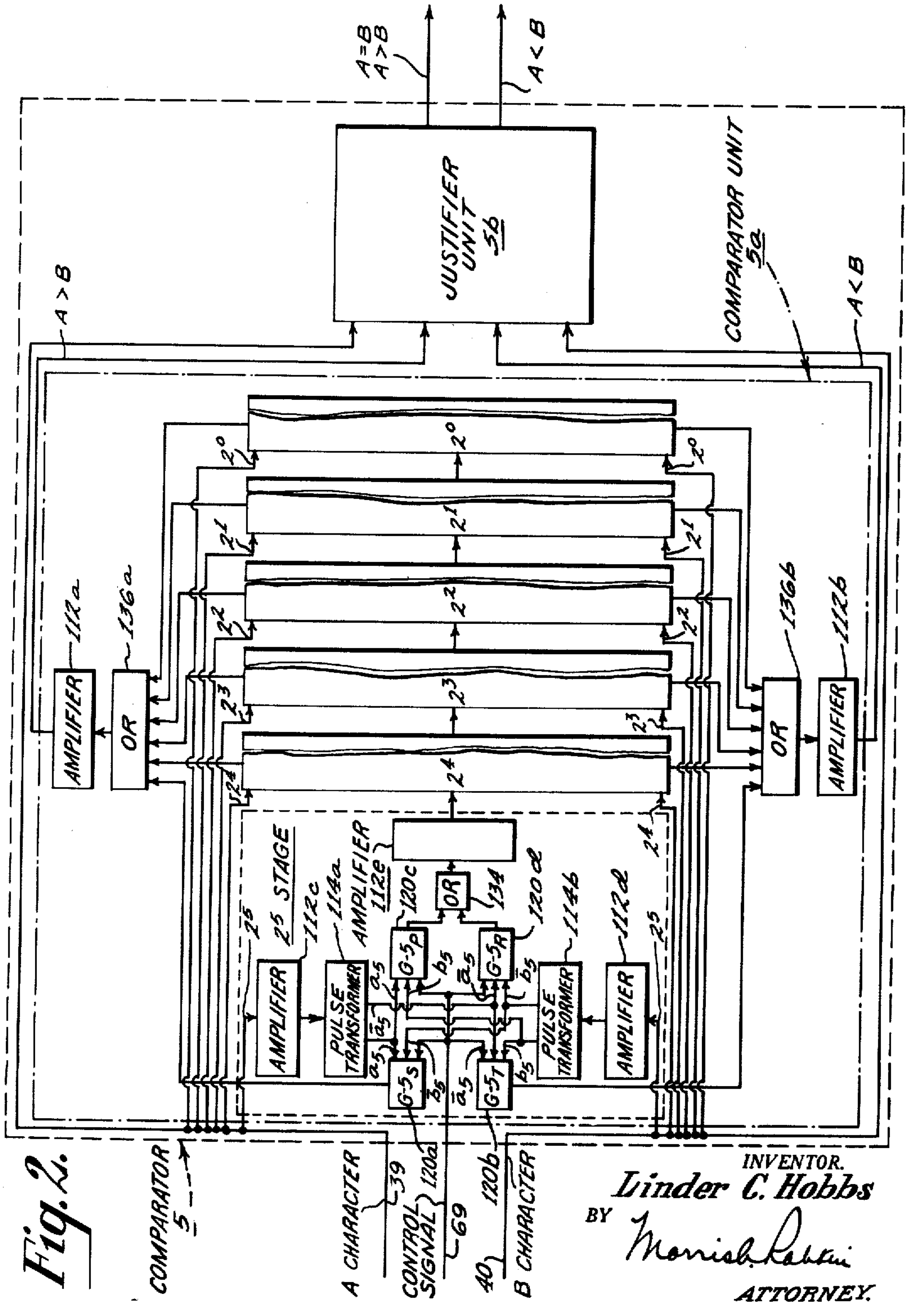

In the accompanying drawing:

Fig. 1 is a schematic diagram of a memory system according to the invention, and Fig. 2 is a schematic diagram of a comparator suitable for use in the memory system of Fig. 1.

*Arrangement of the memory system*

Referring to the drawing, all the lines except the output leads of the "or" gate 9, the advance pulse generator 11, and the flip-flop 7 represent trunk lines. Each of the trunk lines contains a plurality of leads. Each character is encoded on the tape in seven binary digits or bits. Six of the bits are information bits. The seventh bit is provided for an odd-even or parity check. However, because parity checking is not a feature of this invention, the parity check bit will not be considered and hereinafter, all trunks will be considered as six lines and, all characters as six bits. Each of the six leads of a trunk line carries the signal representing the corresponding bit of a character. The presence of a pulse represents a "1" and the absence of a pulse represents a "0."

Although the characters of a serial number are detected serially by the alpha reading head, the bits within a character are detected in parallel.

The six channels of the input tape A alpha reading head are connected via trunk lines 13 and 14 to the inputs of "and" gate 60. The six channels of the alpha reading head of input tape A are also connected via trunk lines 13 and 42 to a first set of six inputs of "or" gate 9. The gates which form a part of the preferred embodiment of the present invention are well known in the art. An "and" gate is an electronic circuit which has a plurality of inputs so designed that the output is energized when, and only when, a certain definite set of input conditions are met. An "or" gate is an electronic circuit having a plurality of inputs so designed that the output is energized whenever one or more inputs are energized. Suitable "and" gate and "or" circuits are described in an article entitled "Diode Coincidence and Mixing Circuits in Digital Computers" by Tung Chang Chen published in the Proceedings of the IRE May 1950, at pages 511–514. Although the "and" gates are shown as a single block, it is to be understood that a different "and" gate circuit is supplied for each input lead. For example, "and" gate 60 contains six separate "and" gate circuits each having a separate output and two separate inputs. Likewise, although the "or" gate circuits are shown as a single block, it is to be understood that each "or" gate except "or" gate 9 contains a first set of six inputs and a second set of six inputs having six different outputs. Thus, for example, "or" gate 8 contains a first set of six inputs which are connected to trunk line 64 and a second set of inputs which are connected to trunk line 29. The six outputs of "or" gate 8 are connected to trunk line 15. Although "or" gate 9 is provided with two different sets of six inputs, there is but one output signal. The output of "or" gate 9 is connected via conductors 45 and 63 to the input of delay line 61. The output of delay 61 is connected via conductors 70 and 62 to the inputs of "and" gate 60. The purpose of delay line 61 is to insure that the fresh input characters and the recirculated characters are applied at the inputs of their respective registers in synchronism.

The six output signals of "and" gate 60 are connected via trunk line 64 to the first set of six inputs of "or" gate 8. Each of the six outputs of "or" gate 8 is connected via trunk lines 15 and 16 to a different one of the inputs of the first column of a stepping register A. The stepping registers A and B may be storage registers of the magnetic delay-line storage type described in an article by An Wang entitled "Magnetic Delay-Line Storage" published in the Proceedings of the IRE, April 1951, at pages 401–407. Also, the stepping registers A and B may be of the well-known staticizer type which is described in an article by A. D. Booth entitled the "Physical Realization of an Electronic Digital Computer" published in Electronic Engineering, September 1950, at pages 492–498.

The arrangement of the components for switching the output signals of the alpha reading head of input tape B to the input side of stepping register B is the same as the arrangement previously described in connection with input tape A. Trunk lines 22 and 23 connect the alpha reading head of input tape B with the six inputs of "and" gate 68. The alpha reading head of input tape B is also connected via trunk lines 22 and 43 to a second set of six inputs of "or" gate 9. The output of "or" gate 9 is also connected via conductors 45 and 63 to the input of delay line 61 as described above. The output of delay line 61 is connected via conductors 70, 71, and 67 to the inputs of "and" gate 68. The output signals of "and" gate 68 are connected via trunk line 69 to the first set of six inputs of "or" gate 10. The outputs of "or" gate 10 are connected via trunk lines 24 and 25 each to a different one of the odd cores of the first column of stepping register B.

Stepping registers A and B are arranged in thirty-two columns and six rows. Each column contains six pairs of cores. The first core of a pair is termed the odd core and the second core of a pair is termed the even core. The input signal is applied to the odd core of a pair and the output signal is taken from the even core. The even cores of the first column are connected to the odd cores of the second column, the even cores of the second column are connected to the odd cores of the third column, etc.

Thus, a character of the message may be stored in the six rows of a column. Thirty-two columns are provided in order that the serial number of a message may be stored in the stepping register for an indefinite period of time. The even cores are used to store a serial number and a character is advanced internally from the even cores of a column to the even cores of the following column due to the even-odd advance pulses.

The even cores of the last column of stepping register A are respectively connected via trunk lines 65 and 17 to the inputs of "and" gate G1. The outputs of "and" gate G1 are connected via trunk line 29 to the second set of six inputs of "or" gate 8. Thus, the recirculation path for stepping register A consists of trunk lines 65 and 17, "and" gate G1, trunk line 29, "or" gate 8 and trunk lines 15 and 16. The even cores of the last column of the stepping register A are also connected via trunk lines 65 and 19 to the inputs of "and" gate G2.

The arrangement of the components associated with stepping register B is the same as described in connection with stepping register A. The recirculation path for stepping register B consists of trunk lines 66 and 26, "and" gate G3, trunk line 28, the second set of six inputs of "or" gate 10 and trunk lines 24 and 25.

The even cores of the last column of stepping register B are connected via trunk lines 66 and 39 to the inputs of "and" gate G4.

The outputs of "and" gate G2 are connected via trunk line 21 to a first set of six inputs of "or" gate 12. The outputs of "and" gate G4 are connected via trunk line 30 to a second set of six inputs of "or" gate 12. The six outputs of "or" gate 12 are connected via trunk lines 31 and 32 to a first set of six inputs of comparator 4. The outputs of "or" gate 12 are also connected via trunk lines 31 and 33 to a first set of six inputs of comparator 6.

The condition of flip-flop 7 determines which of the serial numbers is to be recirculated and which of the serial numbers, the one from register A or the one from register B, is to be compared as the z serial number. At the end of each comparison, flip-flop 7 is established in the proper condition for the next comparison. Flip-flop 7 may be the well-known Eccles-Jordan type or any suitable bistable state circuit, such as triggers or bistable multivibrators. Typical circuits are described in chapter three of "High-Speed Computing Devices" by Tompkins and Wakelin, published by the McGraw-Hill Book Company. Flip-flop 7 has a set input "S" and a reset input "R", and a corresponding "1" and a "0" output. When the flip-flop is in the set condition, the "1" output voltage is higher than the "0" output voltage. When the flip-flop is in the reset condition, the "0" output voltage is higher than the "1" output voltage. Signals are applied to the "S" or "R" inputs of flip-flop 7 in accordance with the results of the comparisons set out in the expressions above. If input tape A is to be run next, flip-flop 7 is reset, and if input tape B is to be run next, flip-flop 7 is set. The "1" output of flip-flop 7 is connected via conductor 34 to the inputs of "and" gate G1. This "1" output is also connected via conductor 35 to the inputs of "and" gate G4. The signal applied by the "1" output of flip-flop 7 is used to prime "and" gates G1 and G4. The "0" output of flip-flop 7 is connected via lead 36 to the inputs of "and" gate G3 and via lead 37 to the inputs of "and" gate G2. The "0" output signal of flip-flop 7 is used to prime "and" gates G2 and G3.

The outputs of "or" gate 8 are connected via trunk lines 15 and 38 to the second set of six inputs of comparator 4 and, in addition, the outputs of "or" gate 8 are connected via trunk lines 15 and 39 to the first set of six inputs of comparator 5.

The outputs of "or" gate 10 are connected via trunk lines 24 and 40 to the second set of six inputs of comparator 5 and, in addition, the outputs of "or" gate 10 are connected via trunk lines 24 and 41 to the second set of six inputs of comparator 6. Each of the comparators may be similar to the one described in application Serial No. 394,693 entitled, "Message Comparator," filed by William Ransome Ayres and Joel Newton Smith on November 27, 1953. Another suitable comparator arrangement may be the comparator circuit described in application Serial No. 375,869, entitled, "Electronic Comparator," filed by Philip Cheilik, now Patent No. 2,877,445, if associated with the justifier unit described in application Serial No. 376,714, now Patent No. 2,785,856, filed by Linder C. Hobbs on August 26, 1953, which issued as Patent No. 2,785,856 on March 19, 1957, entitled "Comparator System for Two Variable Length Items."

Each operator operates to determine the relative order of precedence of two different serial numbers which are encoded in a binary system of notation. An appropriate output signal is furnished at the output of each comparator.

"Or" gate 9 serves as a source from which the control signals required by the comparators 4, 5, and 6, the synchronizing signals to prime "and" gates 60 and 68, and the input signal required by the advance pulse generator 11, are received.

Each of the permutations of bits defining a character have at least one bit present therein. Thus, each time a character is read by the alpha reading head of input tape A or B, a pulse is generated in one of the channels of the alpha head of the running tape; and an output pulse is provided from "or" gate 9.

The output signal of "or" gate 9 is applied via conductors 45 and 63 to delay 61 and through delay line 61 via conductors 70 and 79 to the control signal input of comparator 4.

Likewise, the output signal of "or" gate 9 is applied through delay line 61 and via conductors 70, 71, and 48 to the control signal input of comparator 5. Also the output signal of "or" gate 9 is applied through delay line 61 and via conductors 70, 71, and 49 to the control signal input of comparator 6.

In addition, the output signal of "or" gate 9 is applied to the input of advance pulse generator 11 via conductors 45 and 50.

The advance pulse generator 11 generates signals which are applied in a well-known fashion to stepping registers A and B in order to advance a character from one column to the next.

Two different output signals are generated by the advance pulse generator 11. The first signal is an even core advance signal. This signal is applied via conductors 54 and 55 to the inputs of each even core of each column of stepping register A. The even cores advance signal is also applied via conductors 54 and 56 to each even core of each column of stepping register B. The odd cores advance signal is generated by the advance pulse generator approximately 45 microseconds after the even cores advance signal has been applied to even cores of the stepping registers. The delay between the odd and even cores advance signal affords time for the even cores to be turned over before a signal is applied to the odd cores. A delay type multivibrator has been found to be suitable as a generating means for the odd cores advance signal. Other well-known delay means may be used. However, because the advance pulse generator is not a part of the present invention, and because such generators are known, a detailed description is not provided herein.

The odd cores advance signal is applied via conductors 51 and 52 to each odd core of each column of stepping register A. The odd cores advance signal is also applied via conductors 51 and 53 to each odd core of each column of stepping register B.

*Description of comparators*

Each of the comparators 4, 5 and 6 may be similar. A suitable unit for the item comparator 5 is shown more in detail in Fig. 2. Referring to Fig. 2, the comparator 5 includes a character comparator unit 5*a* and a justifier unit 5*b*. The trunk lines 39 and 41 of Fig. 1 each connect the outputs of the "or" gates 8 and 10 to first and second sets of six inputs of the comparator unit 5*a* of Fig. 2. The control signal line 48 of Fig. 1 is connected to a third input of the comparator unit 5*a* of Fig. 2. The comparator unit 5*a* has two outputs designated $A>B$, and $A<B$, connected to a pair of inputs of the justifier unit 5*b*. The trunk lines 39 and 41 also are connected to a second pair of inputs of the justifier unit 5*b*. The justifier unit 5*b* provides three output signals $A=B$, $A>B$, and $A<B$. The output signals $A=B$ and $A>B$ are provided on a first output line, and the $A<B$ output signal is provided on a second output line of the justifier unit 5*b*. The justifier unit 5*b* is similar to that described in the above-identified Hobbs Patent No. 2,785,856.

The comparator unit 5*a* is provided with six separate stages, the first stage of which is shown in detail. Each of the other five stages is similar to the first stage. The six inputs of the set of inputs representing the A character are each connected to a different one of the six stages of the comparator unit 5*a*. The six inputs from the set of inputs representing the B character are each connected to a second input of a different one of the six comparator stages. The control signal on the input lead 69 is applied to a third input of the highest-order comparator stage $2^5$. Each of the comparator stages has a first output connected to a different one of six inputs of a first "or" circuit 136*a*, and each of the stages has another output connected to a different one of six inputs of a second "or" circuit 136*b*. The first "or" circuit 136*a* is connected through an amplifier 112*a* to provide the $A>B$ input to the justifier unit 5*b*. The output of the second "or" circuit 136*b* is connected through another amplifier 112*b* to the $A<B$ output of the justifier unit 5*b*. The $2^5$ stage of the comparator unit 5*a* compares the $2^5$ digits of the A and B characters. The $2^5$ inputs are respectively connected through first and second amplifiers 112*c* and 112*d* to the inputs of a pair of pulse transformers 114*a* and 114*b*. Each of the pulse transformers 114 provides a pair of outputs indicated as $a_5$, $\overline{a_5}$, and $b_5$, $\overline{b_5}$. Two pairs of three-input "and" gates are used to compare the outputs provided by the pulse transformers 114. The first "and" gate $G\text{-}5_S$ has first and second inputs coupled respectively to the $a_5$ and $\overline{b_5}$ outputs of the pulse transformers 114*a* and 114*b*, respectively. A second of the "and" gates $G\text{-}5_T$ has its first and second inputs coupled to the $\overline{a_5}$ and $b_5$ outputs of the pulse transformers 114*a* and *b*, respectively. A third of the "and" gates $G\text{-}5_P$ has its first and second inputs coupled to the $a_5$ and $b_5$ outputs of the first and second pulse transformers 114*a* and 114*b*, respectively. A fourth of the "and" gates $G\text{-}5_R$ has its first and second inputs coupled to the $\overline{a_5}$ and $\overline{b_5}$ outputs of the pulse transformers 114*a* and 114*b*, respectively.

The first "and" gate $G\text{-}5_S$ has an output connected to one input of the first "or" circuit 136*a*. The second of the "and" gates has an output $G\text{-}5_T$ connected to an input of the second "or" gate 136*b*. The third and fourth "and" gates $G\text{-}5_P$ and $G\text{-}5_R$ each has its output connected to a different input of a two-input "or" circuit 134. The output of the "or" circuit 134 is connected to an input of an amplifier 112*e* which has its output connected to the third input of the next comparator stage $2^4$.

The comparator unit 5*a* is used to compare the corresponding A and B characters, and the justifier 56 is used to compare the A and B serial numbers.

In operation, when the $2^5$ digit of the A character represents a binary "1" digit, the $a_5$ output of the pulse transformer 114*a* is high relative to the $\overline{a_5}$ output. When the $2^5$ digit of the A character represents a binary "0," the $\overline{a_5}$ output is high relative to the $a_5$ output of the pulse transformer 114*a*. Similarly, the $b_5$ output of the pulse transformer 114*b* is either high or low relative to the $\overline{b_5}$ output when the $2^5$ digit of the B character corresponds to either a binary "1" or a binary "0," respectively. Accordingly, when the $2^5$ digit of the A character represents a binary "1" and the $2^5$ digit of the B character represents a binary "0," the "and" gate $G\text{-}5_S$ is enabled at two of its three inputs. Each of the other "and" gates of the $2^5$ stage has none or only one of its two inputs enabled. Accordingly, when a control pulse from the control lead 69 is applied to the third inputs of all the "and" gates, only the "and" gate $G\text{-}5_S$ provides an output signal. This output signal is passed by the first "or" circuit 136*a* and the amplifier 112*a* to the $A>B$ input of the justifier unit 5*b*. Similarly, when the $2^5$ digit of the B character represents a binary "1" and the $2^5$ digit of the A character represents a binary "0," the "and" gate $G\text{-}5_T$ provides an output signal which is passed through the second "or" circuit 136*b* and the amplifier 112*b* to the $A<B$ input of the justifier unit 5*b*.

When both the $2^5$ digits of the A and B characters are the same, either binary "1" digits or binary "0" digits, one or the other of the "and" gates $G\text{-}5_P$ and $G\text{-}5_R$ is enabled at its first two inputs. For example, when both $2^5$ digits represent binary "1" digits, the "and" gate $G\text{-}5_P$ is enabled, and when both $2^5$ digits represent binary "0" digits, the "and" gate $G\text{-}5_R$ is enabled. Accordingly, when a control pulse is now applied, the enabled "one" of the "and" gates $G\text{-}5_P$ and $G\text{-}5_R$ produces an output signal which is passed through the two-input of circuit 5a and the amplifier 112e to the third input of the stage $2^4$ of the comparator unit 5a. The $2^4$ digits of the A and B characters are then compared in similar manner. If the $2^4$ digits are unequal, a corresponding signal appears at one of the $A>B$ and $A<B$ inputs of the justifier unit 5b. When both $2^4$ digits are equal, the amplifier 112e of the $2^4$ stage provides an input signal to the $2^3$ stage of the comparator unit 5a. The $2^3$ digits of the A and B characters are then compared, and so on.

The justifier unit 5b operates to compare the A and B serial numbers using the results of the comparison of the individual digits of the two serial numbers. Thus, as described in the above-mentioned Hobbs patent, the justifier unit 5b operates to determine whether the two serial numbers are of the same or of equal length and, depending upon whether or not the serial numbers are, for example, numerical or alphabetical, an appropriate one of the $A=B$, $A>B$, and $A<B$ signals are supplied.

*Operation of the memory system*

In the operation of the system, assume that both stepping registers A and B each have a serial number stored therein. Because stepping registers A and B advance a character in a forward direction, the first character of the serial number which was inserted at column one is advanced column by column and finally becomes stored in the thirty-second column waiting to be read out. The first character of the B serial number is likewise stored in the thirty-second column of stepping register B. The remaining characters of each of the serial numbers are stored in the remaining columns of the stepping registers.

Assume also that input tape A is running, in which case the flip-flop 7 will be in a reset condition and a "0" output signal is furnished. Therefore, "and" gates G2 and G3 are primed to pass signals due to the higher "0" output voltage.

Signals appearing at the inputs of "and" gates G1 and G4 are blocked due to the lower "1" output voltage.

The first character passing beneath the alpha reading head of input tape A is detected and passed via trunk lines 13 and 14 to six inputs of "and" gate 60. At the same time, the signals representing the first character of the "A" serial number are passed via trunk lines 13 and 42 to the first set of six inputs of "or" gate 9. The output signal of "or" gate 9 is applied via conductors 45 and 63 to the input of delay line 61; the output signal of "or" gate 9 is also applied via conductors 45 and 50 to the input of the advance pulse generator 11 which generates an even cores advance signal. The even cores advance signal is applied via conductors 54 and 55 to the even cores of the columns of stepping register A, and via conductors 54 and 56 to the even cores of the columns of stepping register B. The even cores of stepping register A are thereby caused to turn over, furnishing an output signal to the odd cores of the columns of stepping register A. Thus, the serial number stored in stepping register A is advanced from the even cores of each column to the odd cores of each column and the new character can be read into the odd cores of column one. Each odd core of the first column receives any information which is to be inserted into the stepping register A, and each even core of the last column furnishes an output signal at the same time that the even cores advance signal advances the stored characters internally from the even cores of one column to the odd cores of the next column.

The output signals from the last column of the even cores of stepping register A are applied to the inputs of "and" gates G1 and G2 via trunk lines 65, 17 and 65, 19 respectively. However, "and" gate G1 is conditioned by flip-flop 7 against passing the signals, therefore, none of the signals is passed through "and" gate G1. But, "and" gate G2 is conditioned by flip-flop 7 to pass signals and therefore the signals pass through "and" gate G2, and via trunk line 21 to the first set of six inputs of "or" gate 12.

The output signals from the even cores of the last column of stepping register B are passed via trunk lines 66 and 26 to the inputs of "and" gate G3, and also via trunk lines 66 and 39 to the inputs of "and" gate G4. "And" gate G3 is conditioned by flip-flop 7 to pass signals via trunk line 28 to the second set of six inputs of "or" gate 10.

The output signal of delay line 61 is applied via conductors 70 and 62 to the inputs of "and" gate 60. Since "and" gate 60 is already conditioned by the signals received from the alpha reading head of input tape A, the six output signals pass to the first set of six inputs of "or" gate 8.

Therefore, the recirculated signals received at the second set of six inputs of "or" gate 10, and the fresh signals received at the first set of six inputs of "or" gate 8 arrive at their respective "or" gates simultaneously. The output signals of "or" gate 8 are applied to the odd cores of the first column of stepping register A, and are also applied to the second set of inputs of comparator 4 and the first set of inputs of comparator 5. The output signals of "or" gate 10 are applied to the odd cores of the first column of stepping register B and are also applied to the second set of inputs of comparator 5 and the second set of inputs of comparator 6.

The output signals of "or" gate 12 are applied respectively to the first set of inputs of comparator 4 and to the first set of inputs of comparator 6.

At this point in the operation, the fresh input signals from input tape A, representing the first character of the "A" message serial number, are stored in the odd cores of the first column of stepping register A, and are also applied to the appropriate set of inputs of comparators 4 and 5. The character stored in the last column of stepping register A has been brought out by "and" gate G2 and "or" gate 12 to the appropriate set of inputs of comparators 4 and 6. The recirculated signals representing the first character of the "B" message serial number are stored in the odd cores of the first column of stepping register B, and are also applied to the appropriate inputs of comparators 5 and 6.

Approximately 45 microseconds after the even cores advance signal is generated, the advance pulse generator 11 supplies the odd cores advance signal. The odd cores advance signal is applied via conductors 51 and 52 to the odd cores of each of the columns of stepping register A and also via conductors 51 and 53 to the odd cores of stepping register B. Thus, each of the odd cores is turned over, causing the following even core to which it is connected to respond to the output signal of the corresponding odd core. Thus, the first character of the fresh serial number is stored in the even cores of the first column of stepping register A, and the first character of the recirculated serial number is stored in the even cores of the first column of stepping register B.

Comparators 4, 5, and 6 compare each of the pairs of characters applied at their respective inputs. Continued operation of input tape A brings each additional character of the serial number beneath the alpha reading head. The operation of the system is similar to that just described for the first character. The net result is that the fresh serial number has been placed in stepping register A; the recirculated serial number (previously in B) has been placed in stepping register B and the stale serial number (initially stored in stepping register A) has been applied to comparators 4 and 6 to be compared with the fresh and recirculated serial numbers.

Upon receipt of the last character of the serial numbers, each of the comparators furnishes an appropriate output signal. These output signals are, in turn, applied to a logical network and a decision is made by the logical network as to whether input tape A is to continue running. If the decision is affirmative, flip-flop 7 remains in its reset position. If the decision is negative, flip-flop 7 is set and operates to close gates G2 and G3 and open gates G1 and G4, thereby causing the serial number now stored in stepping register A to be recirculated and the serial number stored in stepping register B to be applied to comparators 4 and 6 as the *z* message serial number.

*Summary*

An improved memory system for a "progressive sorting" apparatus has been described herein. The various components have been illustrated to show an operative environment. Any of the well-known stepping registers may be substituted for the magnetic core stepping registers described. The logical "and" and "or" gates may be of the diode or vacuum type, the delay lines may be either a delay-type multivibrator or of the inductance-capacitance type. In short, the memory system disclosed may be employed so long as there is a means for recirculating the serial number stored in one register and replacing the stale serial number of the other register with a fresh serial number, in conjunction with a means for comparing the respective pairs of serial numbers (new and stale, new and recirculated, and stale and recirculated). The memory system of the present invention is compatible with variable word-length systems by providing an additional counter and a suitable pulse generator such that the pulse generator artificially generates a number of pulses equal to the difference between the maximum word length, for example, thirty-two, and the word length actually received.

If the duration of all the signals furnished by the alpha reading heads is too short, then a stage of flip-flops may be interposed between the input from each of the respective alpha reading heads and the corresponding "and" gates 60 and 68. The stage of flip-flops would then supply a D.C. bias to the "and" gate representative of the character detected by the alpha reading head. A delayed signal from "or" gate 9 could be used to clear the flip-flop stage after a suitable time interval.

The output signals of the three comparators indicate the relationship between three different pairs of serial numbers and may be furnished to any suitable utilization device responsive to such indication.

What is claimed is:

1. In an information handling system, a first storage means, a second storage means, each of said storage means individually having an input, an output, and a recirculation path from said output to said input including a first gating means, second gating means associated with the output of each of said storage means outside said paths, means to apply a plurality of signals alternatively to the input of a selected one of said storage means, and means to open the first gating means in the recirculation path of the unselected storage means and to close the first gating means in the recirculation path of said selected storage means and to control the said second gating means.

2. In an information handling system, a first storage means, a second storage means, each of said storage means respectively having an input, an output, and a recirculation path including a first gating means, a second gating means coupled to the output of each of said storage means, means to apply a plurality of signals alternatively to the input of a selected one of said first and second storage means, switch means for controlling said first and second gating means, said switch means having a first position and a second position, means to operate said switch means alternatively to one of said positions to open the first gating means in the recirculation path of said unselected storage means and to close the first gating means in the recirculation path of said selected storage means and to open the second gating means associated with the output of said selected storage means and to close the second gating means associated with the output of said unselected storage means.

3. In an information handling system, a first storage means, a second storage means, each of said storage means having an input, an output and a recirculation path including a first gating means, second gating means connected to the output of each of said storage means, switch means having a first position and a second position, means to connect the first position of said switch means to the first gating means of said first storage means and to the second gating means of said second storage means, means to connect the second position of said switch means to the second gating means of said first storage means and to the first gating means of said second storage means, a first comparing means, a second comparing means, a third comparing means, each of said comparing means having a pair of inputs, means coupling both of said second gating means with one of the inputs of said first and third comparing means, means connecting the input of said first storage means with an input of said first and second comparing means, means connecting the input of said second storage means with an input of said second and third comparing means, and means to apply a plurality of signals alternatively to the input of one of said storage means and the inputs of said connected comparing means, and means to operate said switch means to one of its positions such that the output of the unselected storage means is coupled through said first gating means to said unselected storage means input and the inputs of said connected comparing means and the output of the selected storage means is connected through said second gating means to the inputs of said coupled comparing means.

4. The invention as described in claim 3 wherein the means to apply said plurality of signals includes a trunk line connected to the alpha reading head of a running tape, and said switch means is operated to one or the other of its two positions depending upon which of said input tapes is running.

5. In a sorting system, a memory device for supplying three different serial numbers in pairs to the inputs of three different comparing means, one of said serial numbers being stored in a first storage means and a different one of said serial numbers being stored in a second storage means and a different one of said serial numbers being supplied at the input of said memory device, the said device comprising means to supply a serial number alternatively to the input of a selected one of said storage means and to the inputs of two of said comparing means, to circulate the serial number stored in said selected storage means to an input of one of said two comparing means and to an input of the third comparing means, means to recirculate the serial number stored in the unselected storage means and to circulate the serial number in said unselected storage means to the other of said two comparing means and to an input of the third comparing means.

6. The invention as claimed in claim 5 wherein means are provided to synchronize the arrival of the three different pairs of serial numbers at the inputs of the three different comparing means.

7. In a sorting system, a memory device for furnishing three different serial numbers in pairs to the inputs of three different comparing means, one of said serial numbers being stored in a first storage means, a different one of said serial numbers being stored in a second storage means, and a different one of said serial numbers being supplied at the input of said memory device, the said device comprising a pair of first gating means, one coupled to the first storage means and the other coupled to the second storage means, means to supply a serial number alternatively to a selected one of said first gating means, means to recirculate a stored serial number to the unselected one of said first gating means, control means coupled to each of said first gating means, said control means being responsive to the individual characters of the serial number supplied to said selected gating means.

8. The invention as described in claim 7 wherein said control means includes a gate having a first set of inputs coupled to the channels of a reading head adjacent the path of a first input tape, a second set of inputs coupled to the channels of a reading head adjacent the path of a second input tape, and an output.

9. The invention as described in claim 7 wherein said control means includes a gate having a plurality of inputs and an output, separate means coupling a respective one of said inputs to a corresponding channel of a first and second reading head, and delay means connecting said output to said pair of first gating means.

10. The invention as described in claim 7 wherein said first and second storage means comprise a first and second static serial memory, an advance pulse generating means for generating an odd and an even advance output pulse in response to an input signal, means connecting said odd and even advance pulses to said first and second storage means, and means connecting said control means and said advance pulse generating means.

11. The invention as described in claim 7 wherein said control means includes a gate having a plurality of inputs and an output, separate means coupling a respective one of said inputs to a corresponding channel of a first and second reading head, delay means connecting said output to said pair of first gating means, a first, second, and third comparing means, and means, including said delay means, connecting said output to said first, second and third comparing means.

12. The invention as claimed in claim 11 including means coupling one of said first pair of gating means to said first and second comparing means, and means coupling the other of said first pair of gating means to said second and third comparing means.

13. The invention as claimed in claim 12 including means selectively coupling a selected one of said first and second storage means to said first and third comparing means.

14. The invention as claimed in claim 13, said first and second storage means each having a separate input and a separate output, and means selectively coupling a selected one of said storage means outputs to said selected storage means input.

15. In a sorting system, apparatus for furnishing three different serial numbers to the inputs of three different comparing means, wherein a serial number is denoted by one or more ordered characters, and wherein a first serial number represents a number previously in storage, a second serial number represents a fresh number, and the third serial number represents a recirculated number, the combination comprising means for reading said first serial number to an input of a first and a third of said comparing means, means for reading said second serial number to the input of said first and a second of said comprising means, and means for reading the third serial number to the input of said second and said third comparing means.

16. In a sorting system having three different comparing means, first and second storage means each having an input, and three different serial numbers, wherein a serial number is denoted by one or more ordered characters, and wherein a first of said serial numbers represents a stale number, a second of said serial numbers represents a fresh number, and the third of said serial numbers represents a recirculated number, the combination comprising means for reading said first serial number to an input of both a first and a third of said comparing means, means for reading said second serial number to an input of both said first and a second of said comparing means and to the input of said first storage means, and means for reading said third serial number to an input of both said second and said third comparing means and to the input of said second storage means.

17. In a sorting system having three different comparing means, first and second storage means, and having three different serial numbers, wherein a serial number is denoted by one or more ordered characters, and wherein the first one of said serial numbers is a fresh number, a second one of said serial numbers being stored in said first storage means, and the third one of said serial numbers being stored in said second storage means, the combination comprising means for reading said fresh serial number alternatively to the input of a selected one of said first and second storage means and to the inputs of both a first and second of said comparing means, means for reading the serial number stored in said selected storage means to the inputs of said second and one of said first and third comparing means, and means for reading the serial number stored in the unselected one of said first and second storage means to the input of said unselected storage means and to the inputs of both said first and third comparing means.

18. In a sorting system having three different comparing means and having three different serial numbers, wherein a serial number is denoted by one or more characters, and wherein a first of said serial numbers represents a stored number, a second of said serial numbers represents a fresh number supplied to the system, and the third of said serial numbers represents another stored number, the combination comprising a first coincidence circuit, and "or" gate circuit, means for reading said second serial number to an input of said coincidence circuit and to an input of said "or" gate circuit, means for delaying any "or" gate circuit output signal and for furnishing said output signal to the input of said coincidence circuit, means for furnishing any output signal of said coincidence circuit to the input of both a first and second of said comparing means, means for reading said first serial number to the input of both said first and a third of said comparing means, and means for reading said third serial number to the input of both said second and said third comparing means.

References Cited in the file of this patent

UNITED STATES PATENTS 2,798,216 Goldberg et al. ---------- July 2, 1957

UNITED STATES PATENT OFFICE

CERTIFICATE OF CORRECTION

Patent No. 2,907,003 September 29, 1959

Linder C. Hobbs

It is hereby certified that error appears in the printed specification of the above numbered patent requiring correction and that the said Letters Patent should read as corrected below.

Column 6, line 70, for "operator" read -- comparator --; column 14, line 2, for "comprising" read -- comparing --.

Signed and sealed this 3rd day of May 1960.

(SEAL)
Attest:

KARL H. AXLINE
Attesting Officer

ROBERT C. WATSON
Commissioner of Patents